(12) United States Patent
Okumura et al.

(10) Patent No.: US 11,086,485 B2
(45) Date of Patent: *Aug. 10, 2021

(54) CONNECTION CONTROL DEVICE AND CONNECTION CONTROL METHOD

(71) Applicant: SONY CORPORATION, Tokyo (JP)

(72) Inventors: Mitsuo Okumura, Tokyo (JP); Hirofumi Hibi, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,798

(22) Filed: Jun. 26, 2019

(65) Prior Publication Data

US 2019/0317646 A1    Oct. 17, 2019

Related U.S. Application Data

(63) Continuation of application No. 15/128,510, filed as application No. PCT/JP2015/057776 on Mar. 16, 2015, now Pat. No. 10,353,546.

(30) Foreign Application Priority Data

Apr. 2, 2014   (JP) ................. 2014-076429

(51) Int. Cl.
*G06F 3/048*      (2013.01)
*G06F 3/0482*     (2013.01)
(Continued)

(52) U.S. Cl.
CPC .......... *G06F 3/0482* (2013.01); *G06F 3/0486* (2013.01); *H04N 5/222* (2013.01); *H04N 5/268* (2013.01)

(58) Field of Classification Search
CPC ...... G06F 3/0482; G06F 3/0486; G06F 3/048; H04N 5/222; H04N 5/268
See application file for complete search history.

(56) References Cited

U.S. PATENT DOCUMENTS 6,519,540 B1 *   2/2003   Salandro ............... H04H 60/04
                                                          345/55
2003/0181995 A1   9/2003   Nagasaka et al.
(Continued)

FOREIGN PATENT DOCUMENTS

CN   1246683 A    3/2000
DE   69927321 T2  7/2006
(Continued)

OTHER PUBLICATIONS

Office Action for JP Patent Application No. 2016-511509, dated Mar. 19, 2019, 07 pages of Office Action and 07 pages of English Translation.
(Continued)

*Primary Examiner* — Mahelet Shiberou
(74) *Attorney, Agent, or Firm* — Chip Law Group

(57) ABSTRACT

User's connection operation is facilitated using a user interface screen. A user interface screen is displayed on which a combination of an arbitrary source apparatus and a destination apparatus is designated from a predetermined number of source apparatuses and destination apparatuses, to operate a connection. Based on operation on the user interface screen, the connection between the source apparatus and the destination apparatus is controlled. On the user interface screen, a button is disposed in which a combination of a source apparatus and a destination apparatus is registered. When the button is operated, control is executed such that the source apparatus and the destination apparatus of the registered combination are connected.

14 Claims, 10 Drawing Sheets

(51) Int. Cl.
*H04N 5/222* (2006.01)
*H04N 5/268* (2006.01)
*G06F 3/0486* (2013.01)

(56) References Cited

U.S. PATENT DOCUMENTS

| | | |
|---|---|---|
| 2005/0025321 A1 | 2/2005 | Ajamian |
| 2010/0177341 A1 | 7/2010 | Mihara |
| 2011/0197154 A1 | 8/2011 | Corona |
| 2014/0245203 A1* | 8/2014 | Lee .................. G06F 9/445 715/765 |
| 2014/0297516 A1 | 10/2014 | Brown et al. |
| 2015/0077781 A1* | 3/2015 | Asai .................. H04N 1/00389 358/1.13 |

FOREIGN PATENT DOCUMENTS

| | | |
|---|---|---|
| EP | 0969653 A3 | 3/2001 |
| JP | 2000-222341 A | 8/2000 |
| JP | 2004-032041 A | 1/2004 |
| JP | 2007-317353 A | 12/2007 |

OTHER PUBLICATIONS

Nakamura, et al., "A Study on Communication User Interface Management System", IPSJ SIG Notes, vol. 92, No. 50, Jul. 9, 1992, 21 pages including 16 pages of English translation.
International Preliminary Report on Patentability of PCT Application No. PCT/JP2015/057776, dated Oct. 13, 2016, 08 pages of English Translation and 04 pages of IPRP.
International Search Report and Written Opinion of PCT Application No. PCT/JP2015/057776, dated May 26, 2015, 07 pages of English Translation and 06 pages of ISRWO.
Non-Final Office Action for U.S. Appl. No. 15/128,510, dated Apr. 18, 2018, 13 pages.
Final Office Action for U.S. Appl. No. 15/128,510, dated Oct. 30, 2018, 08 pages.
Advisory Office Action for U.S. Appl. No. 15/128,510, dated Jan. 24, 2019, 02 pages.
Notice of Allowance for U.S. Appl. No. 15/128,510, dated Mar. 11, 2019, 05 pages.

* cited by examiner

CONNECTION CONTROL DEVICE AND CONNECTION CONTROL METHOD

CROSS-REFERENCE TO RELATED APPLICATION

The present application is a continuation application of U.S. patent application Ser. No. 15/128,510, filed Sep. 23, 2016, which is a national stage entry of PCT/JP2015/057776, filed Mar. 16, 2015, which claims priority from prior Japanese Priority Patent Application 2014-076429 filed in the Japan Patent Office on Apr. 2, 2014, the entire contents of which are hereby incorporated by reference.

TECHNICAL FIELD

The present technology relates to a connection control device and a connection control method, and more particularly, to a connection control device and a connection control method for controlling a connection between a source apparatus and a destination apparatus which are connected to a network.

BACKGROUND ART

Conventionally known is connecting, to a network such as Ethernet, a source apparatus which outputs a video signal and a destination apparatus which receives a video signal and records or displays the signal in a studio or the like, and controlling the connection between the source apparatus and the destination apparatus by a personal computer, a tablet or the like connected to the network. For example, the source apparatus is a camera, a video reproduction apparatus or the like, and the destination apparatus is a monitor, a video recording apparatus or the like.

There has been proposed enabling such connection control with ease on a user interface screen for the operation of a connection between arbitrary source apparatus and destination apparatus from a predetermined number of source apparatuses and destination apparatuses. For example, Patent Document 1 discloses that, on a user interface screen, with a plurality of source apparatuses (input resources) disposed in one direction of a matrix and a plurality of destination apparatuses (output resources) disposed in the other direction, user's designation of an intersection (cross point) enables a desired connection.

CITATION LIST

Patent Document

Patent Document 1: JP 2004-032041 A

SUMMARY OF THE INVENTION

Problems to be Solved by the Invention

An object of the present technology is to facilitate user's connection operation using a user interface screen.

Solutions to Problems

A concept of the present technology lies in a connection control device that controls a connection between a source apparatus and a destination apparatus that are connected to a network, the connection control device including:

a display control unit that displays a first user interface screen for designating a predetermined combination of a source apparatus and a destination apparatus to operate the connection; and a connection control unit that controls the connection between the source apparatus and the destination apparatus based on operation on the first user interface screen, wherein on the first user interface screen, a first button is disposed in which a combination of a source apparatus and a destination apparatus is registered, and the connection control unit executes control such that, when the first button of the first user interface screen is operated, the source apparatus and the destination apparatus of the combination registered in the first button are connected.

The present technology relates to a connection control device that controls a connection between a source apparatus and a destination apparatus which are connected to a network. For example, the connection control device is configured to include a personal computer, a tablet or the like connected to the network. By a display control unit, a first user interface screen is displayed for designating a predetermined combination of a source apparatus and a destination apparatus to operate a connection. This first user interface screen is displayed on, for example, a display unit of a monitor or a tablet connected to a personal computer. Then, a connection control unit controls the connection between the source apparatus and the destination apparatus based on operation on the first user interface screen.

On the first user interface screen, a first button is disposed, on which a combination of a source apparatus and a destination apparatus is registered. When the first button on the first user interface screen is operated, the connection control unit executes control so as to connect the source apparatus and the destination apparatus of the combination registered in this first button.

Thus, in the present technology, when the first button disposed on the first user interface screen is operated, a source apparatus and a destination apparatus of a combination registered in the first button are connected. Therefore, registering a desired combination in the first button enables a user to reliably execute operation of connecting the source apparatus and the destination apparatus of the combination with ease, simply by operating the first button, resulting in assistance to the user.

Note that, in the present technology, for example, on the first user interface screen, a second button in which a source apparatus is registered and a third button in which a destination apparatus is registered may be further disposed, and the connection control unit may execute control such that, when the second button and the third button are operated in succession, the source apparatus registered in the second button and the destination apparatus registered in the third button are connected.

Further, in the present technology, for example, the display control unit may further display a second user interface screen, on which a button disposed on the first user interface screen is edited. Thus, displaying a second user interface screen enables a user to edit a button disposed on the first user interface screen with ease.

In this case, for example, the second user interface screen may include a routing screen and an edit screen, on the routing screen, a plurality of source apparatuses may be disposed in one direction of a matrix and a plurality of destination apparatuses is disposed in the other direction, and on the edit screen, a button disposed on the first user interface screen may be created with reference to the routing screen. Thus, the second user interface screen includes an edit screen together with a routing screen, so that a user is allowed to create a button on the edit screen by simple operation such as drag and drop while referring to the routing screen.

Further, in this case, for example, when a cross point corresponding to a predetermined combination of a source apparatus and a destination apparatus of the routing screen is dragged and dropped to the edit screen, the first button, in which the predetermined combination is registered, may be created on the edit screen, when a predetermined source apparatus of the routing screen is dragged and dropped to the edit screen, the second button, in which the predetermined source apparatus is registered, may be created on the edit screen, and when a predetermined destination apparatus of the routing screen is dragged and dropped to the edit screen, the third button, in which the predetermined destination apparatus is registered, may be created on the edit screen.

Here, the edit screen may be provided with a button blank display part indicative of a button creation position as a position of the drag and drop. For example, when a button is created on the edit screen, the button blank display part to be provided on the edit screen may be provided at a position adjacent to the created button. Thus, providing a button blank display part on the edit screen enables indication, to a user, that a new button can be created, and also enables indication of a drop destination of drag and drop to a user.

Further, for example, when a cross point corresponding to a second combination of a source apparatus and a destination apparatus of the routing screen is dragged and dropped to the first button which is created on the edit screen and in which a first combination of a source apparatus and a destination apparatus of the routing screen is registered, the second combination may be further registered in the first button. In this case, a plurality of combinations can be registered in the first button with ease.

Effects of the Invention

The present technology enables to facilitate user's connection operation using a user interface screen. Effects are not necessarily limited to those described herein, and may be any effects described in this disclosure.

MODES FOR CARRYING OUT THE INVENTION

In the following, modes for carrying out the invention (hereinafter, referred to as "embodiment") will be described. Description will be made in the following order.
1. Embodiment
2. Modification Example
<1. Embodiment>
[Video System]

Figure 1:
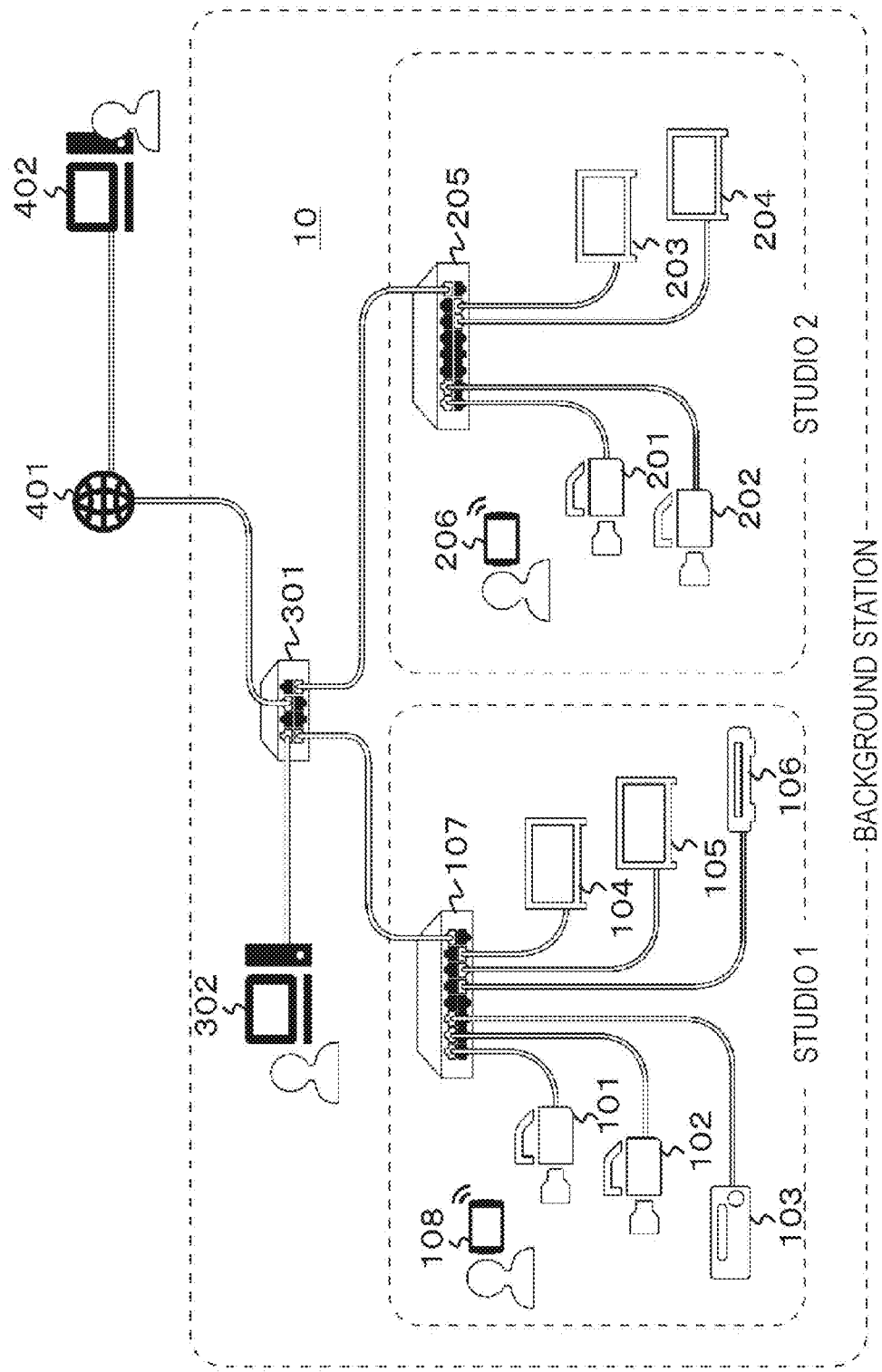
FIG. 1 is a block diagram showing a configuration example of a video system as an embodiment.

FIG. 1 shows a configuration example of a video system 10 in a broadcasting station as an embodiment. The video system 10 includes a source apparatus and a destination apparatus that are disposed in a studio 1, and a source apparatus and a destination apparatus that are disposed in a studio 2. Each apparatus is connected to a network in the broadcasting station. Here, the source apparatus is a video apparatus which outputs a video signal and corresponds to a video reproduction apparatus such as a camera, a VTR or the like. The destination apparatus is a video apparatus which receives a video signal and records or displays the signal, and which corresponds to a video recording apparatus such as a monitor, video server or the like.

In the studio 1, cameras 101 and 102, a video reproduction apparatus 103, monitors 104 and 105, a video recording apparatus 106, and a switching hub 107 are disposed. The respective apparatuses, i.e., the cameras, the video reproduction apparatus, the monitors, and the video recording apparatus, are connected to the switching hub 107 via a network cable. Additionally, in the studio 2, cameras 201 and 202, monitors 203 and 204, and a switching hub 205 are disposed. The respective apparatuses, i.e., the cameras and the monitors, are connected to the switch hub 205 via the network cable. Additionally, outside the studio 1 and the studio 2, a switching hub 301 is disposed, and the switching hub 107 in the studio 1 and the switching hub 205 in the studio 2 are connected to the switching hub 301 via the network cable.

Control of a connection between the source apparatus and the destination apparatus in the video system 10 is enabled by accessing the network in the broadcasting station from a connection control device. The connection control device is configured to include, for example, a personal computer or a tablet. In the illustrated example, in the studio 1, a tablet 108 handled, for example, by a cameraman or a director is shown. Additionally, in the illustrated example, in the studio 2, a tablet 206 handled, for example, by a cameraman or a director is shown. These tablets 108 and 206 are wirelessly connected to the network in the broadcasting station.

Additionally, the illustrated example shows a personal computer 302 which is connected to the external switching hub 301 outside the studio 1 and the studio 2 via the network cable and which is handled, for example, by a director. Additionally, the illustrated example shows, outside the broadcasting station, a personal computer 402 which is connected to the switching hub 301 via Internet 401 and which is handled, for example, by a director.

The connection control device (the tablet 108, 206, or the personal computer 302, 402) displays, in the monitor or a display unit, a user interface screen for designating a combination of an arbitrary source apparatus and a destination apparatus from a predetermined number of source apparatuses and destination apparatuses connected to the network in the broadcasting station, to operate a connection. Then, the connection control device executes control such that the source apparatus and the destination apparatus of the designated combination are connected based on the operation on the user interface screen.

Figure 2:
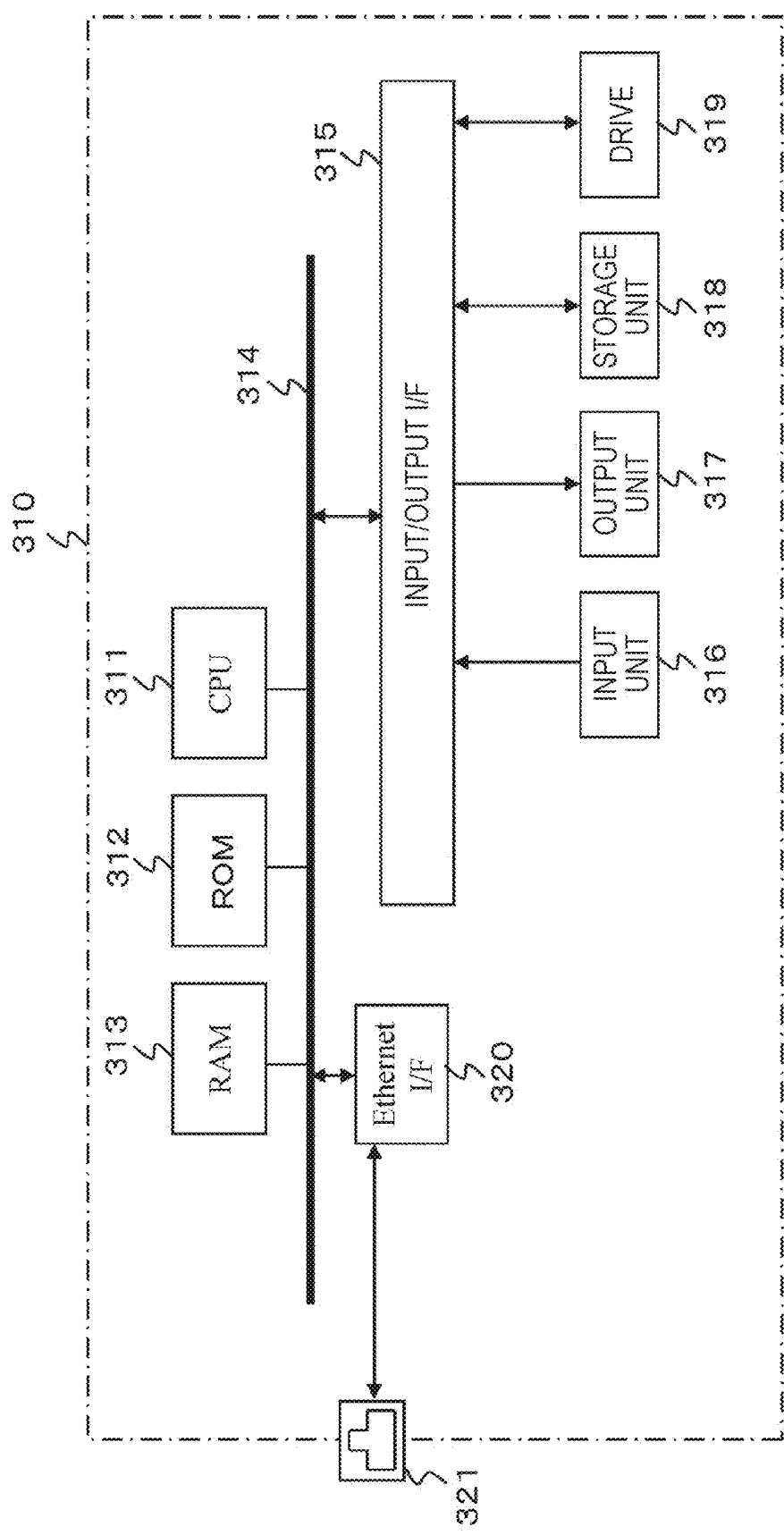
FIG. 2 is a block diagram showing a configuration example of a personal computer included in a connection control device.

FIG. 2 shows a configuration example of a personal computer 310 as a connection control device. Since a configuration of a tablet is substantially the same as a configuration of a personal computer, description thereof will be omitted.

The personal computer 310 has a Central Processing Unit (CPU) 311, a Read Only Memory (ROM) 312, a Random Access Memory (RAM) 313, a bus 314, an input/output interface 315, an input unit 316, an output unit 317, a storage unit 318, a drive 319, an Ethernet interface (Ethernet I/F) 320, and a network terminal 321. "Ethernet" is a registered trademark.

In the personal computer 310, the CPU 311, the ROM 312, and the RAM 313 are connected to each other via the bus 314. To the bus 314, the input/output interface 315 is further connected. To the input/output interface 315, the input unit 316, the output unit 317, the storage unit 318 and the drive 319 are connected.

The input unit 316 is configured to include a keyboard, a mouse, a microphone or the like. The output unit 317 is configured to include a display, a loudspeaker or the like. The storage unit 318 is configured to include a Hard Disk Drive (HDD), a non-volatile memory or the like. The drive 319 drives a removable media such as a magnetic disk, an optical disk, a magneto-optical disk, or a memory card. Additionally, to the bus 314, the Ethernet interface 320 is connected. To the Ethernet interface 320, the network terminal 321 is connected.

Figure 3:
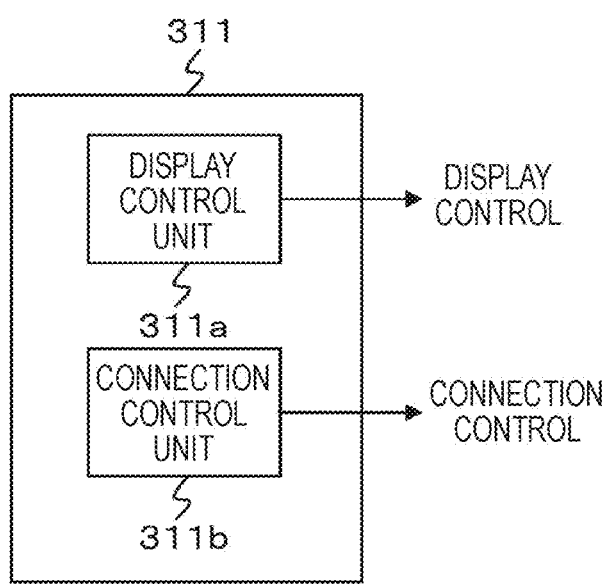
FIG. 3 is a diagram showing a functional configuration of a CPU in the personal computer included in the connection control device.

In the personal computer 310 shown in FIG. 2, the CPU 311 executes display control of the user interface screen by loading a program stored, for example, in the storage unit 318 into the RAM 313 via the input/output interface 315 and the bus 314 and executing the program. The CPU 311 also executes connection control of a source apparatus and a destination apparatus based on operation on the user interface screen. In this case, the CPU 311 configures the display control unit and the connection control unit. FIG. 3 shows a diagram of a functional configuration of the CPU 311. Specifically, the CPU 311 has a display control unit 311a and a connection control unit 311b.

Control Panel Screen

Figure 4:
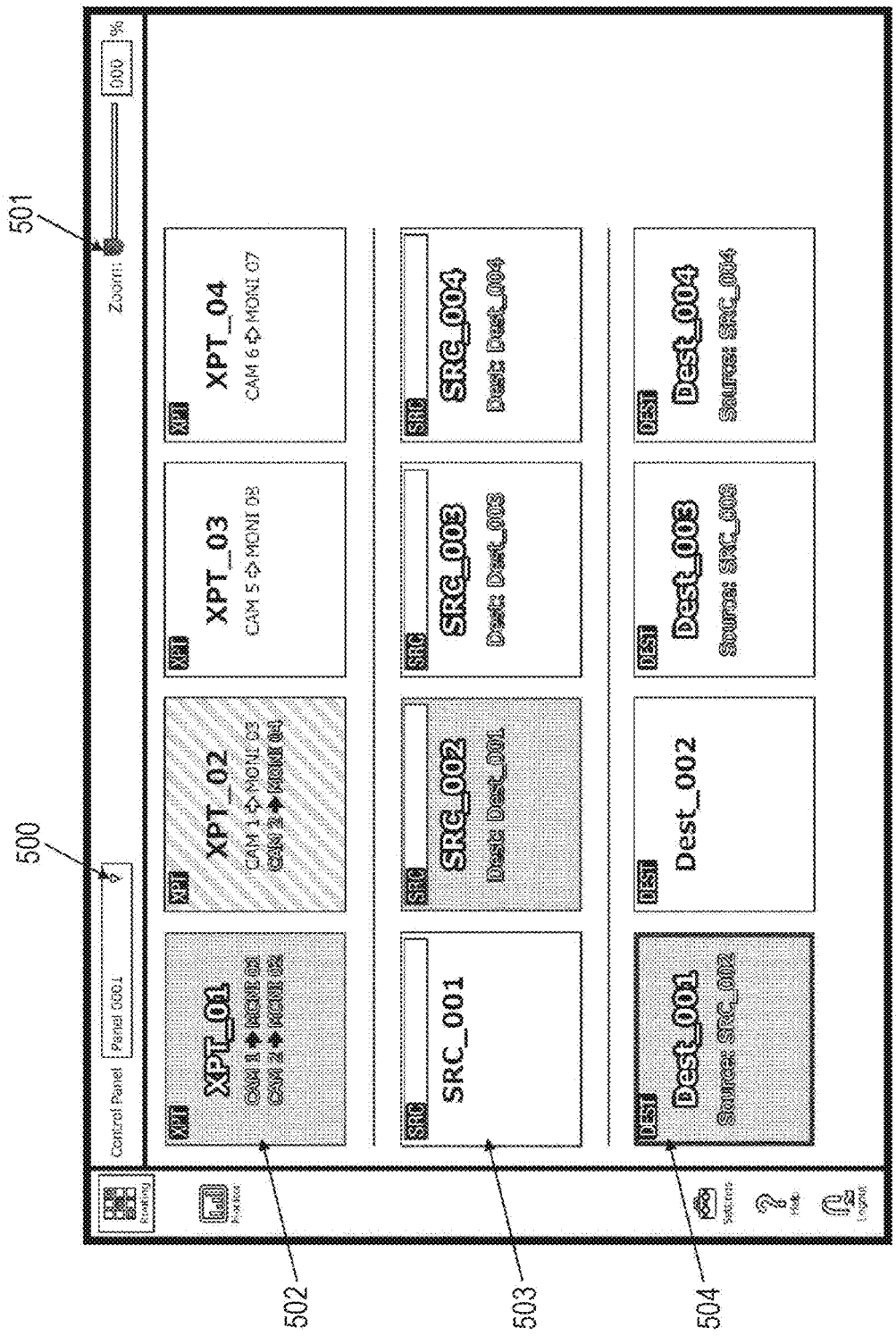
FIG. 4 is a view showing an example of a control panel screen as one of user interface screens for designating a predetermined combination of a source apparatus and a destination apparatus to operate a connection.

FIG. 4 shows an example of a control panel screen, which is displayed in the connection control device (the tablet 108, 206, or the personal computer 302, 402), and which is one of user interface screens for designating a predetermined combination of a source apparatus and a destination apparatus to operate a connection. As a control panel, a plurality of control panels is registerable. By operating a button indicated by an arrow 500 to select a desired control panel from a pull-down menu, the control panel can be called up. In the illustrated example, "Panel_0001" is called up. Additionally, this control panel screen can be zoomed on the screen by operating a lever indicated by an arrow 501.

Disposed on the control panel screen are a cross point (XPT) button (first button) indicated by an arrow 502, a source (SRC) button (second button) indicated by an arrow 503, and a destination (Dest) button (third button) indicated by an arrow 504. In the illustrated example, disposed as the cross point buttons are four buttons, namely, "XPT_01", "XPT_02", "XPT_03" and "XPT_04". Additionally, disposed as the source buttons are four buttons, namely, "SRC_001", "SRC_002", "SRC_003" and "SRC_004". Further, disposed as the destination buttons are four buttons, namely, "Dest_001", "Dest_002", "Dest_003" and "Dest_004".

In the cross point (XPT) button, a combination (cross point) between a source apparatus and a destination apparatus is registered in advance. In the cross point button "XPT_01", a combination of a source apparatus "CAM 1" and a destination apparatus "MONI 01", and a combination of a source apparatus "CAM 2" and a destination apparatus "MONI 02" are registered. Additionally, in the cross point button "XPT_02", a combination of the source apparatus "CAM 1" and a destination apparatus "MONI 03", and a combination of the source apparatus "CAM 2" and a destination apparatus "MONI 04" are registered. Additionally, in the cross point button "XPT_03", a combination of a source apparatus "CAM 5" and a destination apparatus "MONI 08" is registered. Further, in the cross point button "XPT_04", a combination of a source apparatus "CAM 6" and a destination apparatus "MOM 07" is registered.

In the case of the cross point button in which only one combination is registered (i.e. "XPT_03" or "XPT_04"), every time the button is operated, alternate switching is performed between a first state in which the one combination enters an active state and a second state in which the same enters an inactive state. Additionally, in the case of the cross point button in which the plurality of combinations is registered (i.e. "XPT_01" or "XPT_02"), every time the button is operated, alternate switching is performed between a first state in which all the combinations enter the active state and a second state in which all the combinations enter the inactive state.

In the case of the cross point button in which the plurality of combinations is registered, there may be a third state in which only a part of the combinations enters the active state by being controlled by other connection control device. In a combination to enter the active state, a source apparatus and a destination apparatus of the combination are connected.

Here, a cross point button in which all the combinations are in the active state, a cross point button in which all the combinations are in the inactive state, and a cross point button in which only a part of the combinations is in the active state are set to be in display states different from one another.

For example, a cross point button in which all the combinations are in the active state has such a display state as shown by the cross point button ("XPT_01"), in which, for example, with a hue set by a user, chroma and luminance are increased and characters or the like indicating a combination are highlighted. Additionally, for example, a cross point button in which all the combinations are in the inactive state has such a display as shown by the cross point button ("XPT_03", "XPT_04"), in which, for example, with a hue set by a user, chroma and luminance are reduced.

Additionally, for example, a cross point button in which only a part of the combinations is in the active state has such a display as shown by the cross point button ("XPT_2"), which is an intermediate display state. For example, it is set to be a hatching state in which high chroma and luminance parts and low parts are alternately arranged. Alternatively, although not shown in the figure, an upper half may be a high chroma and luminance part and a lower half may be a low chroma and luminance part.

Figure 5A:
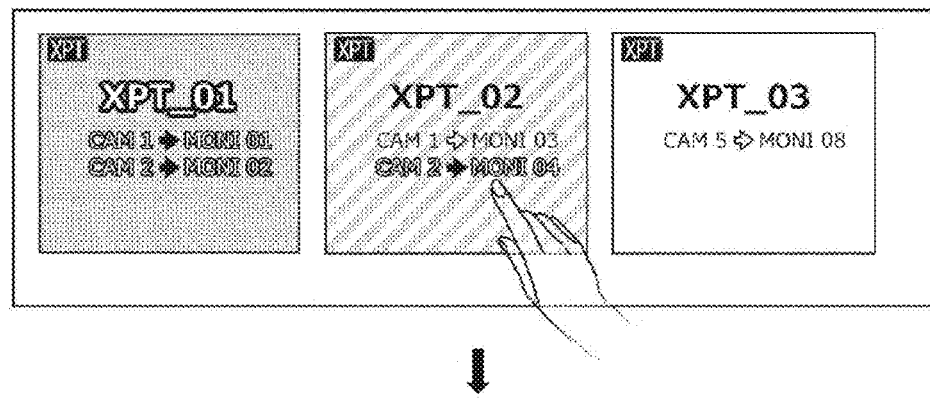
FIGS. 5A, 5B, and 5C are views showing an example of a behavior of a cross point button in which a plurality of combinations is registered.
Figure 5B:
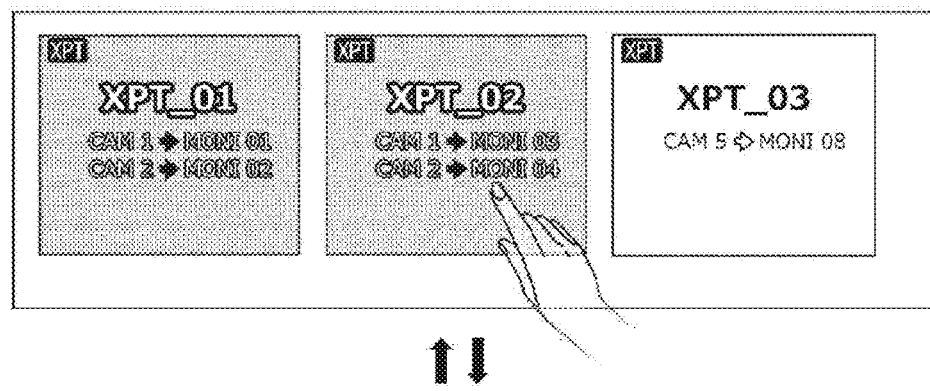
Figure 5C:
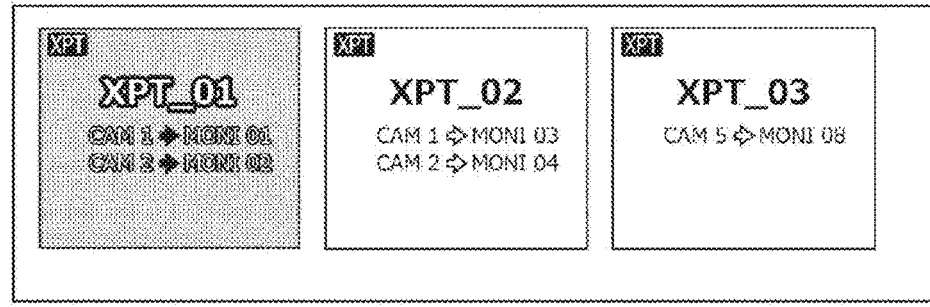

FIGS. 5A, 5B, and 5C show an example of a behavior of a cross point button in which a plurality of combinations is registered. Here, the cross point button "XPT_02" is currently in operation. When the button is operated in the second state in which all the combinations are in the inactive state as shown in FIG. 5C, the button enters the first state in which all the combinations are in the active state as shown in FIG. 5B. Additionally, when the button is operated in this state, the button enters the first state in which all the combinations are in the inactive state as shown in FIG. 5C. Additionally, when the button is operated in the third state in which only a part of the combinations is in the active state as shown in FIG. 5A, the button enters the first state in which all the combinations are in the active state as shown in FIG. 5B.

Returning to FIG. 4, in each source (SRC) button, a source apparatus is registered in advance. Additionally, in each destination (Dest) button, a source apparatus is registered in advance. When a source button and a destination button are operated in succession, the source apparatus and the destination apparatus registered in these buttons are connected in a paired state. Thus, in each of the paired buttons, a button name (apparatus name) of each partner side is displayed.

Figure 6A:
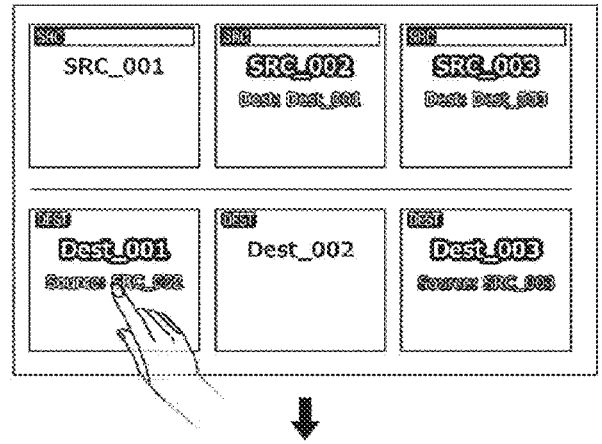
FIGS. 6A, 6B, and 6C are views showing an example of behaviors of a source button and a destination button.
Figure 6B:
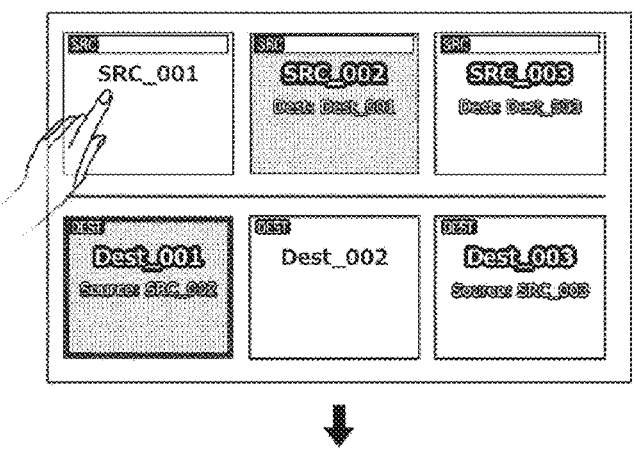

FIGS. 6A, 6B, and 60 show an example of behaviors of the source buttons and the destination buttons. As shown in FIG. 6A, it is assumed that, as a destination button to which a source button is to be assigned, a destination button "Dest_001" is operated. At this time, as shown in FIG. 6B, a display mode of the destination button "Dest_001" changes to enter, for example, a depressed state. Additionally, in this process, when there exists a source button being in the paired state with the destination button "Dest_001", the source button enters, for example, a light emission state. In the illustrated example, a source button "SRC_002" enters the light emission state.

Figure 6C:
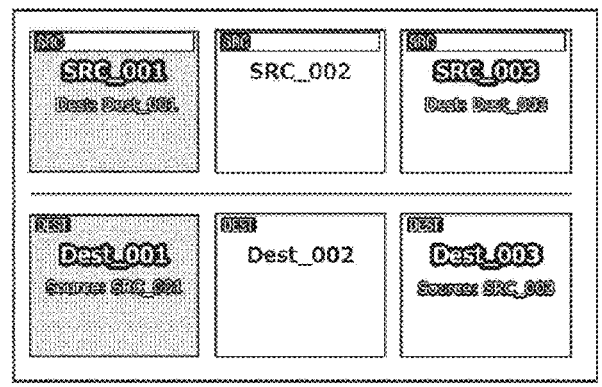

In this state, when a source button "SRC_001" is operated as shown in FIG. 6B, the source button "SRC_001" and the destination button "Dest_001" are paired, so that apparatuses registered therein enter a connection state. Then, at this time, the source button "SRC_001" and the destination button "Dest_001" enter, for example, the light emission state to show that the buttons are paired as shown in FIG. 6C.

Note that, in this step, only one source button can be paired with one destination button and, therefore, paring between the destination button "Dest_001" and the source button "SRC_002" is cancelled.

Figure 7A:
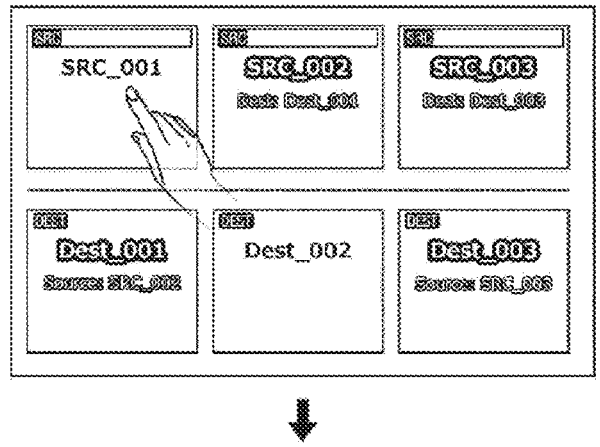
FIGS. 7A, 7B, and 7C are views showing an example of behaviors of a source button and a destination button.
Figure 7B:
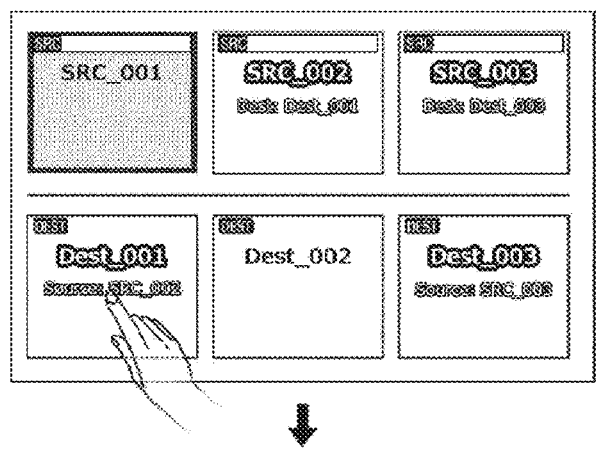

Also FIGS. 7A, 7B, and 70 show an example of behaviors of the source buttons and the destination buttons. It is assumed that, as a source button to which a destination button is to be assigned, the source button "SRC_001" is operated as shown in FIG. 7A. At this time, as shown in FIG. 7B, a display mode of the source button "SRC_001" changes to, for example, the depressed state.

Figure 7C:
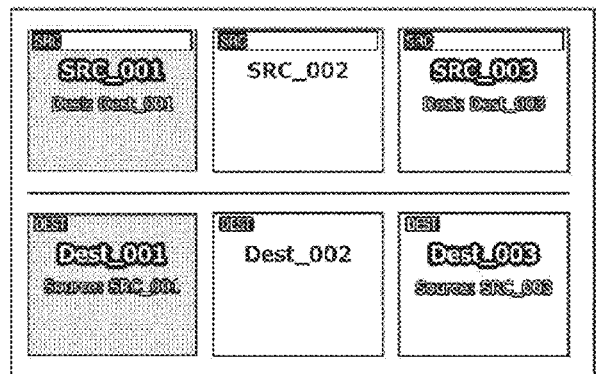

When the destination button "Dest_001" is operated in this state as shown in FIG. 7B, the destination button "Dest_001" and the source button "SRC_001" are paired, so that apparatuses registered therein enter the connection state. Then, at this time, the source button "SRC_001" and the destination button "Dest_001" enter, for example, the light emission state to show that the buttons are paired as shown in FIG. 7C. Note that, in this step, pairing between the destination button "Dest_001" and the source button "SRC_002" having been in paired state is cancelled.

Edit Control Panel Screen

Figure 8:
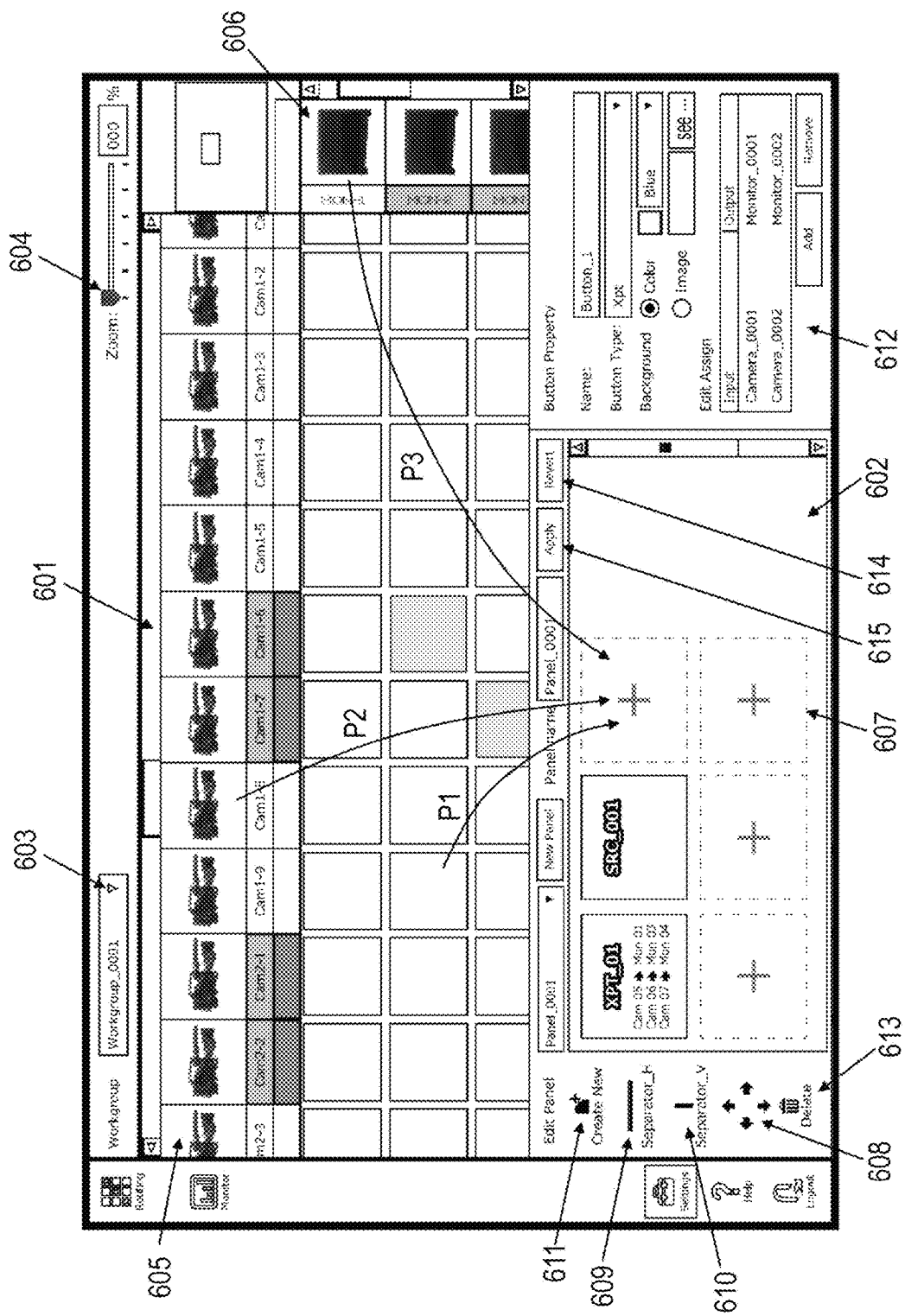
FIG. 8 is a view showing an example of an edit control panel screen as one of user interface screens.

FIG. 8 shows an example of an edit control panel screen which is displayed in the connection control device (the tablet 108, 206, or the personal computer 302, 402) and which is one of the user interface screens. The edit control panel screen simultaneously includes a routing screen indicated by an arrow 601 and an edit screen indicated by an arrow 602. The routing screen is disposed on the upper side of the edit control panel screen and the edit screen is disposed on the lower side of the edit control panel screen. The arrangement of these screens is not limited to this example.

The routing screen is a screen for selection of a desired combination of a source apparatus and a destination apparatus, selection of a source apparatus, selection of a destination apparatus, and the like. The routing screen is provided for each work group. By operating a button indicated by an arrow 603 to select a desired work group from a pull-down menu, a routing screen for the work group can be called up. In the illustrated example, "Workgroup_0001" is selected. Additionally, the routing screen can be zoomed on the screen by operating a lever indicated by an arrow 604.

On the routing screen, a plurality of source apparatuses and a plurality of destination apparatuses is disposed in matrix. Specifically, on the routing screen, the plurality of source apparatuses is horizontally disposed in an upper part, as indicated by an arrow 605. In this case, each source apparatus is displayed as an icon, and an apparatus name and the like can be displayed as well. The icon can be replaced by an arbitrary image prepared by a user.

Additionally, on the routing screen, as indicated by an arrow 606, a plurality of destination apparatuses is vertically aligned in a right part. In this case, each destination apparatus is displayed as an icon, and an apparatus name and the like can be displayed as well. The icon can be replaced by an arbitrary image prepared by a user.

The edit screen 602 is a screen for editing buttons (the cross point buttons, the source buttons, the destination buttons) disposed on the edit control panel screen. On the edit screen, as indicated by an arrow 607, rectangular button blank display parts each indicative of a button creation position are displayed by broken lines. In a state where no button is created on the edit screen, only one part is displayed, for example. Additionally, after a button is created, such a state, as shown in the figure, is attained in which a plurality of button blank display parts is displayed so as to surround the created button. Note that, a position and the number of button blank parts displayed are not limited to those in this example.

As indicated by an arrow P1, when a cross point (intersection) corresponding to a predetermined combination of a source apparatus and a destination apparatus on the routing screen is selected and the cross point is dragged and dropped to the button blank display part of the edit screen, a cross point button in which the predetermined combination is registered is created on the edit screen.

When a drop destination to which such a cross point is dragged and dropped is a cross point button already created on the edit screen, the combination of the source apparatus and the destination apparatus is added to this cross point button. This enables a cross point button to have a plurality of combinations of source apparatuses and destination apparatuses registered.

Additionally, on the routing screen, a plurality of cross points can also be selected by successive clicks. When the plurality of cross points is dragged and dropped to the button blank display part on the edit screen, a cross point button in which the plurality of the combinations of the source apparatuses and destination apparatuses are registered is created on the edit screen.

Additionally, as indicated by an arrow P2, when a predetermined source apparatus on the routing screen is selected and the source apparatus is dragged and dropped to the button blank display part of the edit screen, a source button in which the predetermined source apparatus is registered is created on the edit screen. Further, as indicated by an arrow P3, when a predetermined destination apparatus on the routing screen is selected and the destination apparatus is dragged and dropped to the button blank display part on the edit screen, a destination button in which the predetermined destination apparatus is registered is created on the edit screen.

When a button created on the edit screen is selected, a corresponding part of the routing screen corresponding to the button enters a selected state. In other words, a display mode of the corresponding part is to indicate the selected state, though the state is not shown. For example, when a cross point button created on the edit screen is selected, a cross point corresponding to a combination of a source apparatus and a destination apparatus registered in the cross point button enters the selected state. Additionally, for example, when a source button created on the edit screen is selected, a source apparatus registered in the source button enters the selected state. This enables a user to confirm what is registered in the button created on the edit screen.

An operation button indicated by an arrow 608 is a shift operation button for up-and-down and right-and-left movements in order to shift a button created on the edit screen. After a predetermined button is selected on the edit screen, operation of this shift operation button results in shifting the position of the predetermined button. After a predetermined button is selected on the edit screen, dragging and dropping the predetermined button also enables to shift the position of the predetermined button.

When a drop destination is the button blank display part, the predetermined button is moved to the button blank display part. In this case, the original position of the predetermined button turns to be, for example, the button blank display part. Additionally, when a drop destination is a position of other button, the predetermined button is moved to the position of that other button. In this case, that other button is moved to the predetermined button positon. In other words, in this case, the positions of the predetermined button and that other button are exchanged.

An operation button indicated by an arrow 609 is a horizontal separator setting button for setting a separator extending in a horizontal direction, which partitions the edit screen for a button created on the screen. Selecting the horizontal separator setting button and dragging and dropping the same to the edit screen results in setting the horizontal separator at the drop destination. In this case, a length of the horizontal separator is automatically adjusted so as to cover a range of the created button.

An operation button indicated by an arrow 610 is a vertical separator setting button for setting a separator extending in a vertical direction, which partitions the edit screen for a button created on the screen. Selecting this vertical separator setting button and dragging and dropping the same to the edit screen results in setting the vertical separator at the drop destination. In this case, a length of the vertical separator is automatically adjusted so as to cover a range of the created button.

In a state where the button blank display part on the edit screen is selected, operation of "Create New" button indicated by an arrow 611 results in creating a new button in the button blank display part. Properties of the thus created new button can be set on a property setting screen indicated by an arrow 612. In a state where a predetermined button of the edit screen is selected, properties of the button can be set on the property setting screen. On the property setting screen, a background color or a background image of each button can be set as well. A background image of a button can also be replaced by an arbitrary image prepared by a user.

In a state where a predetermined button of the edit screen is selected, operation of "Delete" button indicated by an arrow 613 results in deleting the predetermined button. Additionally, operation of "Revert" button indicated by an arrow 614 results in deleting all the buttons created on the edit screen. Additionally, operation of "Apply" button indicated by an arrow 615 results in registering each button created on the edit screen in a called control panel.

Session List Screen

Figure 9:
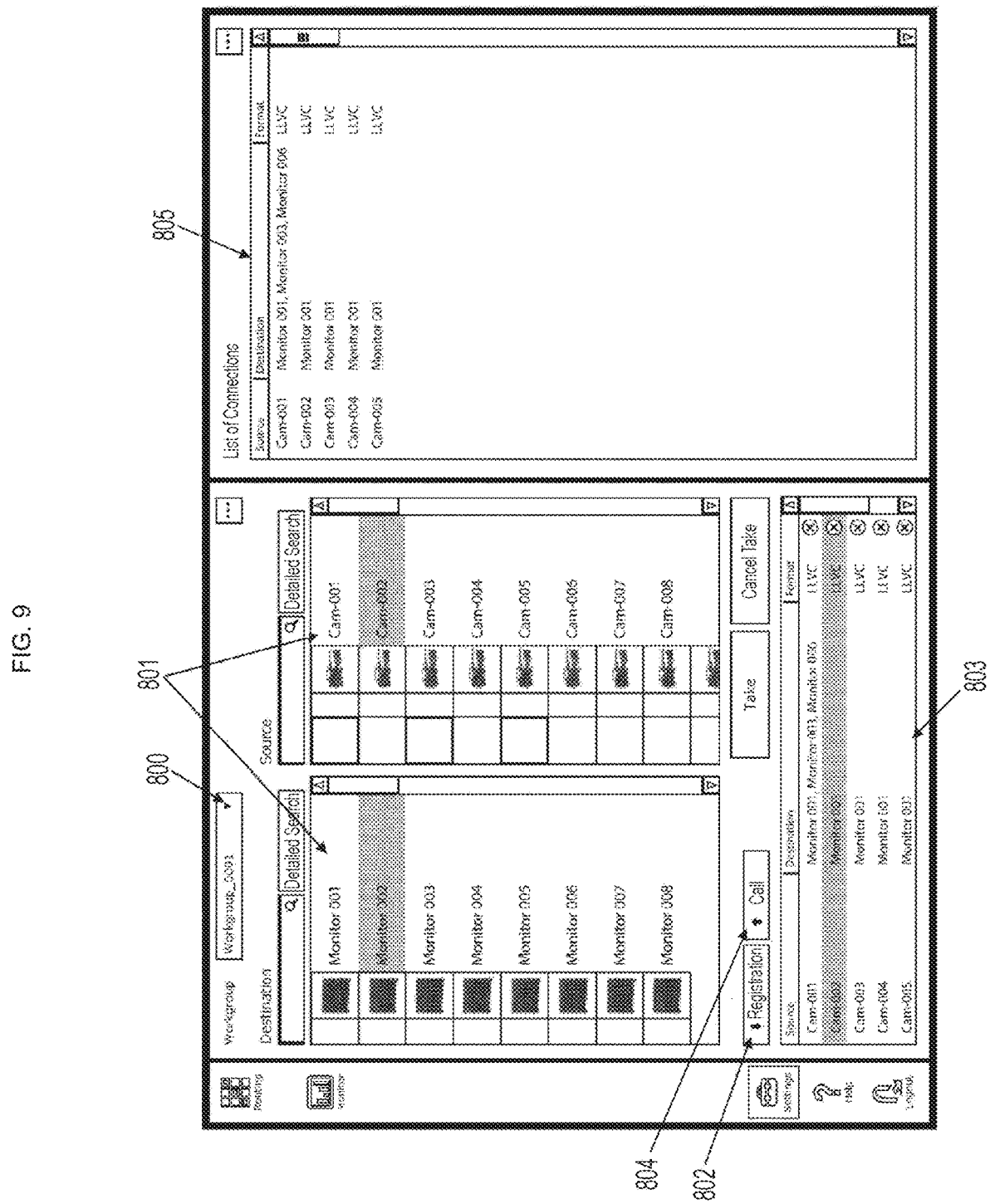
FIG. 9 is a view showing an example of a session list screen as one of user interface screens for designating a combination of arbitrary source apparatus and destination apparatus to operate a connection.

FIG. 9 shows an example of a session list screen which is displayed in the connection control device (the tablet 108, 206, or the personal computer 302, 402) and which is one of the user interface screens for designating a combination of an arbitrary source apparatus and a destination apparatus to operate a connection. This session list screen is a most primitive screen on which a source apparatus and a destination apparatus are displayed in a list to select a cross point (intersection).

This session list screen is provided for each work group. By operating a button indicated by an arrow 800 to select a desired work group from a pull-down menu, a session list screen for the work group can be called up. In the illustrated example, a "Workgroup_0001" is selected.

As indicated by an arrow 801, in an upper left part of the screen, lists of source apparatuses and destination apparatuses connected to the network are displayed, respectively. After selecting a combination of a source apparatus and a destination apparatus from the list, operation of "Registration" button indicated by an arrow 802 enables registration of the combination. Based on the registration, a connection between the source apparatus and the destination is controlled.

A display indicated by an arrow 803 represents combinations of source apparatuses and destination apparatuses registered. After one of the combinations of registered source apparatuses and destination apparatuses is selected, operation of "Call" button indicated by an arrow 804 enables the combination to be called up to the list. The right side of the screen is being currently active, i.e. the combination of the connected source apparatus and destination apparatus is displayed as indicated by an arrow 805.

Figure 10:
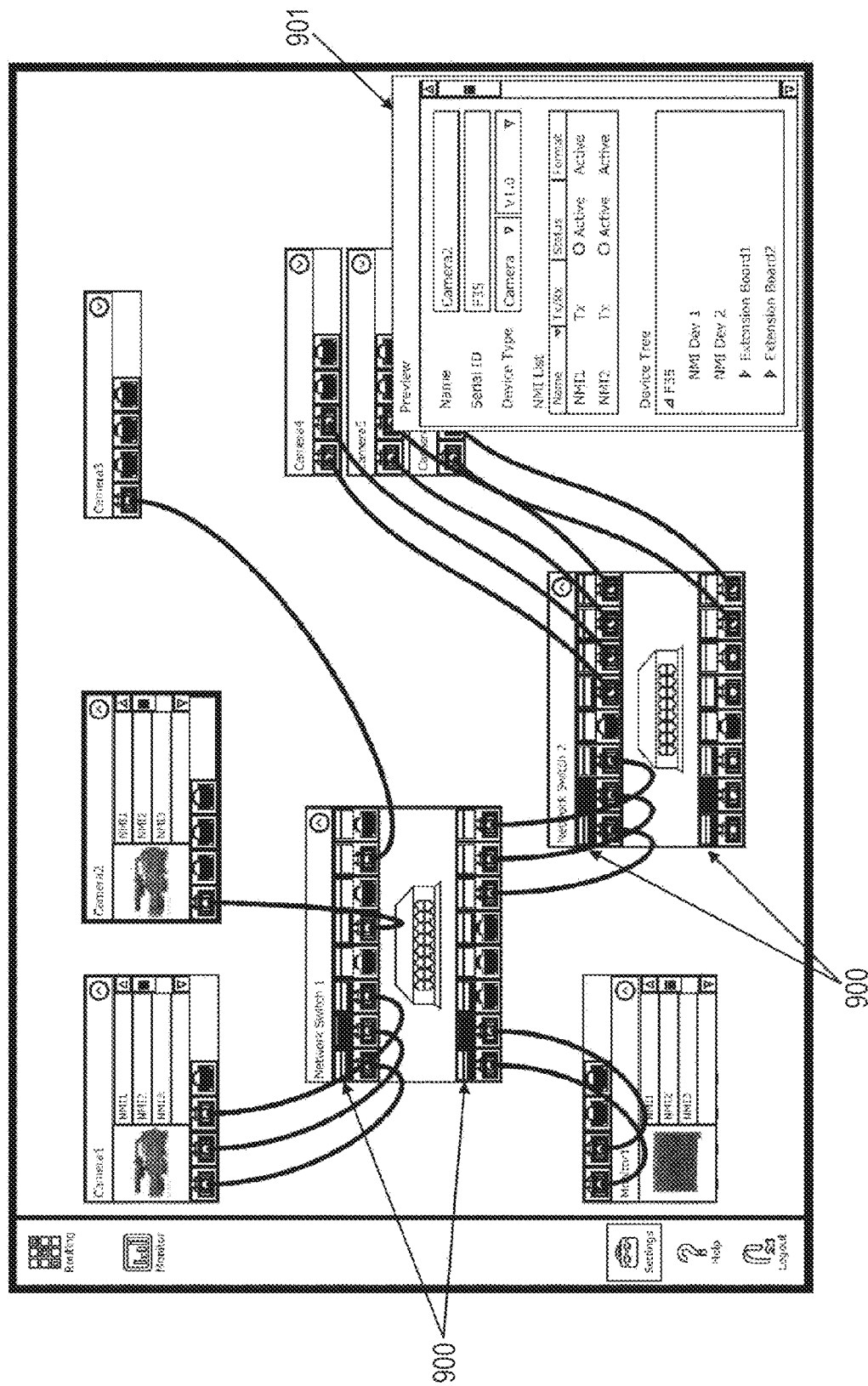
FIG. 10 is a view showing an example of a topology map screen as one of user interface screens.

FIG. 10 shows an example of a topology map screen which is displayed in the connection control device (the tablet 108, 206, or the personal computer 302, 402) and which is one of the user interface screens. This is a screen that enables a use to view, on one screen, connection state of the network and a load imposed on each terminal. This example shows a case where the network is configured to include a plurality of cameras as source apparatuses, one monitor as a destination apparatus and two switching hubs (network switches).

As indicated by an arrow 900, corresponding to each terminal at input/output of the switching hub, a load display part is provided in which a load of each terminal is indicated by a height of piled bars (e.g. green bars). A user is allowed to read a current connection state of the network on the topology map screen. Additionally, the user is allowed to read a load state of each terminal at input/output of the switching hub on the topology map screen. When the load is heavy, the user is allowed to take such a measure as replacing a cable connected to the terminal with a cable that is thick enough to ensure a sufficient bandwidth.

On the topology map screen, clicking a mouse at a display part of each apparatus enables displaying the properties of the apparatus. In the illustrated example, properties of a camera 2 are displayed as indicated by an arrow 901.

As described above, in the video system 10 shown in FIG. 1, the connection control device (the tablet 108, 206, or the personal computer 302, 402) is capable of displaying the control panel screen (see FIG. 4) as a user interface screen. Then, by operating the cross point (XPT) button, the user is allowed to execute operation of connecting a source apparatus and a destination apparatus of a combination registered in the button. Additionally, by operating the source (SRC) button and the destination (Dest) button in succession, the user is allowed to execute operation of connecting the registered source apparatus and destination apparatus. Accordingly, the user is allowed to reliably execute desired connection operation with ease, resulting in assistance to the user.

2. Modification Example

In the above embodiment, description has been made of an example of the present technology applied to a video system in a broadcasting station. As a matter of course, the present technology is similarly applicable to like video systems for medical care or education.

Additionally, the present technology can also assume the following configuration.

(1) A connection control device that controls a connection between a source apparatus and a destination apparatus that are connected to a network, the connection control device including:
a display control unit that displays a first user interface screen for designating a predetermined combination of a source apparatus and a destination apparatus to operate a connection; and
a connection control unit that controls the connection between the source apparatus and the destination apparatus based on operation on the first user interface screen, wherein
on the first user interface screen, a first button is disposed in which a combination of a source apparatus and a destination apparatus is registered, and
the connection control unit executes control such that, when the first button of the first user interface screen is operated, the source apparatus and the destination apparatus of the combination registered in the first button are connected.

(2) The connection control device according to (1), wherein
on the first user interface screen, a second button in which a source apparatus is registered and a third button in which a destination apparatus is registered are further disposed, and
the connection control unit executes control such that, when the second button and the third button are operated in succession, the source apparatus registered in the second button and the destination apparatus registered in the third button are connected.

(3) The connection control device according to (2), wherein the display control unit further displays a second user interface screen, on which a button disposed on the first user interface screen is edited.

(4) The connection control device according to (3), wherein
the second user interface screen includes a routing screen and an edit screen,
on the routing screen, a plurality of source apparatuses is disposed in one direction of a matrix and a plurality of destination apparatuses is disposed in the other direction, and
on the edit screen, a button disposed on the first user interface screen is created with reference to the routing screen.

(5) The connection control device according to (4), wherein
when a cross point corresponding to a predetermined combination of a source apparatus and a destination apparatus of the routing screen is dragged and dropped to the edit screen, the first button, in which the predetermined combination is registered, is created on the edit screen,
when a predetermined source apparatus of the routing screen is dragged and dropped to the edit screen, the second button, in which the predetermined source apparatus is registered, is created on the edit screen, and
when a predetermined destination apparatus of the routing screen is dragged and dropped to the edit screen, the third button, in which the predetermined destination apparatus is registered, is created on the edit screen.

(6) The connection control device according to (5), wherein the edit screen is provided with a button blank display part indicative of a button creation position as a position of the drag and drop.

(7) The connection control device according to (6), wherein, when a button is created on the edit screen, the button blank display part to be provided on the edit screen is provided at a position adjacent to the created button.

(8) The connection control device according to any of (5) to (7), wherein, when a cross point corresponding to a second combination of a source apparatus and a destination apparatus of the routing screen is dragged and dropped to the first button which is created on the edit screen and in which a first combination of a source apparatus and a destination apparatus of the routing screen is registered, the second combination is further registered in the first button.

(9) A connection control method for controlling a connection between a source apparatus and a destination apparatus that are connected to a network, the connection control method including:
a display controlling step to display a first user interface screen for designating a predetermined combination of a source apparatus and a destination apparatus to operate a connection; and
a connection control step to control the connection between the source apparatus and the destination apparatus based on operation on the first user interface screen, wherein
a first button, in which a combination of a source apparatus and a destination apparatus is registered, is disposed on the first user interface screen, and
in the connection control step, control is executed such that, when the first button of the first user interface screen is operated, the source apparatus and the destination apparatus of the combination registered in the first button are connected.

REFERENCE SIGNS LIST

10 Video system
101, 102, 201, 202 Camera
103 Video reproduction apparatus 104, 105, 203, 204 Monitor
106 Video recording apparatus
107, 205, 301 Switching hub
108, 206 Tablet
302, 310, 402 Personal computer
401 Internet

The invention claimed is:

1. An information processing apparatus, comprising:
a central processing unit (CPU) configured to:
control a display screen to display a user interface that configures a connection between a plurality of source devices and a plurality of destination devices, wherein
each source device of the plurality of source devices and each destination device of the plurality of destination devices is connected to a network, and
the user interface includes:
a routing screen that displays an intersection, wherein the intersection indicates a connection of a pair of one of the plurality of source devices and one of the plurality of destination devices, and
a control screen;
control the control screen to display a first button of a plurality of buttons based on a first operation on the intersection, wherein
the first operation is to move the intersection from the routing screen to a button blank display part on the control screen,
the pair is registered to the first button of the plurality of buttons, and
the button blank display part on the control screen corresponds to the first button of the plurality of buttons;
control the control screen to display a separator between the first button and a second button of the plurality of buttons based on a second operation on the separator, wherein
the second button is different from the first button, and
the second operation is to move the separator from a separator setting button to the control screen; and
control the connection between the plurality of source devices and the plurality of destination devices based on an operation of the first button of the plurality of buttons of the user interface,
wherein the connection between the plurality of source devices and the plurality of destination devices is controlled to connect the one of the plurality of source devices and the one of the plurality of destination devices of the pair registered to the first button of the plurality of buttons.

2. The information processing apparatus according to claim 1, wherein the routing screen comprises:
a plurality of source icons in a first direction of a matrix, wherein the plurality of source icons corresponds to the plurality of source devices,
a plurality of destination icons in a second direction of the matrix, wherein the plurality of destination icons corresponds to the plurality of destination devices, and
a plurality of cross points, wherein each cross point of the plurality of cross points indicates a combination of the one of the plurality of source devices and the one of the plurality of destination devices.

3. The information processing apparatus according to claim 1, wherein
the network is an Ethernet network,
the plurality of source devices and the plurality of destination devices are connected to a network switcher, and
the CPU is further configured to control the network switcher to connect the one of the plurality of source devices and the one of the plurality of destination devices of the pair registered to the first button of the plurality of buttons.

4. The information processing apparatus according to claim 1, wherein
the CPU is further configured to control a touch panel device to display the user interface, and
the operation of the first button is accepted on the touch panel device.

5. The information processing apparatus according to claim 1, wherein
the CPU is further configured to control a touch panel screen of a tablet device to display the user interface, and
the tablet device is connected wirelessly to the information processing apparatus.

6. The information processing apparatus according to claim 1, wherein
the plurality of the buttons indicates different pairs of the plurality of source devices and the plurality of destination devices.

7. The information processing apparatus according to claim 1, wherein the CPU is further configured to update the routing screen to reflect the connection between the plurality of source devices and the plurality of destination devices based on the operation of the first button of the plurality of buttons in the control screen.

8. An information processing method, comprising:
displaying a user interface that configures a connection between a plurality of source devices and a plurality of destination devices, wherein
each source device of the plurality of source devices and each destination device of the plurality of destination devices is connected to a network, and
the user interface includes:
a routing screen that displays an intersection, wherein the intersection indicates a connection of a pair of one of the plurality of source devices and one of the plurality of destination devices, and
a control screen;
controlling the control screen to display a first button of a plurality of buttons based on a first operation on the intersection, wherein
the first operation is to move the intersection from the routing screen to a button blank display part on the control screen,
the pair is registered to the first button of the plurality of buttons, and
the button blank display part on the control screen corresponds to the first button of the plurality of buttons;
controlling the control screen to display a separator between the first button and a second button of the plurality of buttons based on a second operation on the separator, wherein
the second button is different from the first button, and
the second operation is to move the separator from a separator setting button to the control screen; and
controlling the connection between the plurality of source devices and the plurality of destination devices based on an operation of the first button of the plurality of buttons of the user interface,
wherein the connection between the plurality of source devices and the plurality of destination devices is controlled to connect the one of the plurality of source devices and the one of the plurality of destination devices of the pair registered to the first button of the plurality of buttons.

9. An information processing system, comprising:
a plurality of source devices;
a plurality of destination devices,
wherein each source device of the plurality of source devices and each destination device of the plurality of destination devices is connected to a network; and
an information processing apparatus that includes a central processing unit (CPU), wherein the CPU is configured to:
control a display screen to display a user interface that configures a connection between the plurality of source devices and the plurality of destination devices, wherein the user interface includes:
a routing screen that displays an intersection, wherein the intersection indicates a connection of a pair of one of the plurality of source devices and one of the plurality of destination devices, and
a control screen;
control the control screen to display a first button of a plurality of buttons based on a first operation on the intersection, wherein
the first operation is to move the intersection from the routing screen to a button blank display part on the control screen,
the pair is registered to the first button of the plurality of buttons, and
the button blank display part on the control screen corresponds to the first button of the plurality of buttons;
control the control screen to display a separator between the first button and a second button of the plurality of buttons based on a second operation on the separator, wherein
the second button is different from the first button, and
the second operation is to move the separator from a separator setting button to the control screen; and
control the connection between the plurality of source devices and the plurality of destination devices based on an operation of the first button of the plurality of buttons of the user interface,
wherein the connection between the plurality of source devices and the plurality of destination devices is controlled to connect the one of the plurality of source devices and the one of the plurality of destination devices of the pair registered to the first button of the plurality of buttons.

10. The information processing system according to claim 9, further comprising:
a network switcher, wherein
the plurality of source devices and the plurality of destination devices are connected to the network switcher, and
the CPU is further configured to control the network switcher to connect the one of the plurality of source devices and the one of the plurality of destination devices of the pair registered to the first button of the plurality of buttons.

11. The information processing system according to claim 9, further comprising:
a tablet device that includes a touch panel screen, and
the CPU is further configured to control the touch panel screen of the tablet device to display the user interface.

12. The information processing system according to claim 11, wherein the tablet device is connected wirelessly to the information processing apparatus.

13. A medical video processing system, comprising:
a plurality of source devices;
a plurality of destination devices,
wherein each source device of the plurality of source devices and each destination device of the plurality of destination devices is connected to a network; and
an information processing apparatus that includes a central processing unit (CPU), wherein the CPU is configured to:
control a display screen to display a user interface that configures a connection between the plurality of source devices and the plurality of destination devices, wherein the user interface includes:
a routing screen that displays an intersection, wherein the intersection indicates a connection of a pair of one of the plurality of source devices and one of the plurality of destination devices, and
a control screen;
control the control screen to display a first button of a plurality of buttons based on a first operation on the intersection, wherein
the first operation is to move the intersection from the routing screen to a button blank display part on the control screen,
the pair is registered to the first button of the plurality of buttons, and
the button blank display part on the control screen corresponds to the first button of the plurality of buttons;
control the control screen to display a separator between the first button and a second button of the plurality of buttons based on a second operation on the separator, wherein
the second button is different from the first button, and
the second operation is to move the separator from a separator setting button to the control screen; and
control the connection between the plurality of source devices and the plurality of destination devices based on an operation of the first button of the plurality of buttons of the user interface,
wherein the connection between the plurality of source devices and the plurality of destination devices is controlled to connect the one of the plurality of source devices and the one of the plurality of destination devices of the pair registered to the first button of the plurality of buttons.

14. An educational video processing system, comprising:
a plurality of source devices;
a plurality of destination devices,
wherein each source device of the plurality of source devices and each destination device of the plurality of destination devices is connected to a network; and
an information processing apparatus that includes a central processing unit (CPU), wherein the CPU is configured to:
control a display screen to display a user interface that configures a connection between the plurality of source devices and the plurality of destination devices, wherein the user interface includes:
a routing screen that displays an intersection, wherein the intersection indicates a connection of a pair of one of the plurality of source devices and one of the plurality of destination devices, and
a control screen;
control the control screen to display a first button of a plurality of buttons based on a first operation on the intersection, wherein
the first operation is to move the intersection from the routing screen to a button blank display part on the control screen,
the pair is registered to the first button of the plurality of buttons, and
the button blank display part on the control screen corresponds to the first button of the plurality of buttons;
control the control screen to display a separator between the first button and a second button of the plurality of buttons based on a second operation on the separator, wherein
the second button is different from the first button, and
the second operation is to move the separator from a separator setting button to the control screen; and
control the connection between the plurality of source devices and the plurality of destination devices based on an operation of the first button of the plurality of buttons of the user interface,
wherein the connection between the plurality of source devices and the plurality of destination devices is controlled to connect the one of the plurality of source devices and the one of the plurality of destination devices of the pair registered to the first button of the plurality of buttons.

* * * * *